United States Patent [19]
Asghari

[11] Patent Number: 6,088,496
[45] Date of Patent: Jul. 11, 2000

[54] OPTICAL DEVICE FOR SPLITTING UP A MULTI-WAVELENGTH LIGHT BEAM

[75] Inventor: Mehdi Asghari, Swindon, United Kingdom

[73] Assignee: Bookham Technology PLC, Oxfordshire, United Kingdom

[21] Appl. No.: 09/137,455

[22] Filed: Aug. 14, 1998

[30] Foreign Application Priority Data

May 19, 1998 [GB] United Kingdom .................... 9810705

[51] Int. Cl.$^7$ ....................................................... G02B 6/34
[52] U.S. Cl. .................................. 385/37; 385/24; 385/10
[58] Field of Search .................................. 385/37, 24, 33, 385/10, 49, 11

[56] References Cited

U.S. PATENT DOCUMENTS

| | | | |
|---|---|---|---|
| 5,371,813 | 12/1994 | Artigue | 385/24 |
| 5,757,986 | 5/1998 | Crampton et al. | 385/2 |
| 5,881,190 | 3/1999 | Harpin et al. | 385/49 |
| 5,937,113 | 8/1999 | He et al. | 385/11 |
| 5,995,281 | 3/1999 | Simon et al. | 385/37 X |

FOREIGN PATENT DOCUMENTS

| | | |
|---|---|---|
| 0 006 052 A1 | 12/1979 | European Pat. Off. . |
| 2222891 | 3/1990 | United Kingdom . |

OTHER PUBLICATIONS

J.D. Bainbridge, et al., "Demonstration of integrated 12×12 InGaAsP/InP grating wavelength router at 2.5 Gbit/s channel bit rates," Electronic Letters, Aug. 14, 1997: vol. 33 No. 17, pp. 1458–1459.

English translation of Abstract for European Patent No. EP–A–0,006,052 A1; Apr. 30, 1999: p. 1.

*Primary Examiner*—Phan T. H. Palmer
*Attorney, Agent, or Firm*—Fleshner & Kim, LLP

[57] ABSTRACT

An optical device for splitting up a multi-wavelength light beam into a plurality of individual beams, each comprising light of a different wavelength or a narrow beam of wavelengths. The optical device includes an optical grating and an optical system for directing the incident beam onto the optical grating. The incident beam is divided into two portions, and one portion is directed onto the grating in one direction, while the other portion is directed onto the grating along an opposite direction. Preferably the grating is formed in two parts and one beam portion is directed through the two grating parts in succession in one direction while the other beam portion is directed through the two grating parts in succession along an opposite direction. A common mirror may be used to direct light towards the grating and to receive light returning from the grating. The device may also be used as a multiplexer by reversing the direction of light transmitted through the device.

35 Claims, 5 Drawing Sheets

OPTICAL DEVICE FOR SPLITTING UP A MULTI-WAVELENGTH LIGHT BEAM

BACKGROUND OF THE INVENTION

1. Field of the Invention

The present invention relates to an optical device for splitting up a multi-wavelength light beam into a plurality of individual beams each comprising light of a different wavelength or a narrow band of wavelengths. Such a device is commonly called a de-multiplexer.

2. Background of the Related Art

It is known to use an optical transmission grating to split up a multi-wavelength beam of light into individual beams of light of different wavelengths or narrow bands of wavelengths. Such a device comprises a first optical system, for example, a mirror, for directing the multi-wavelength beam onto the grating. On passing through the grating, the multi-wavelength beam is split into individual beams of light of different wavelengths or narrow bands of wavelengths, with the individual beams emerging from the grating at different angles. The individual beams are passed to a second optical system, for example, another mirror, which directs each individual beam into a respective individual waveguide or other optical path device. In such a device, the light passes through each of the two optical systems once and the grating once.

It is also known to use an optical reflection grating formed on the surface of a mirror to split up a multi-wavelength beam of light.

SUMMARY OF THE INVENTION

The object of the present invention is to provide an improved optical device for splitting up a multi-wavelength beam of light into a plurality of individual beams, with each individual beam comprising light of a different wavelength or a narrow band of wavelengths.

According to a first aspect of the invention there is provided an optical device for splitting up a multi-wavelength light beam into a plurality of individual beams of light of different wavelengths or narrow bands of wavelengths comprising:

an optical grating; and an optical system for directing an incident multi-wavelength light beam onto the grating such that a first portion of the light beam passes through the grating in one direction and is split into a first set of individual light beams of different wavelengths or narrow bands of wavelengths, and a second portion of the light beam passes through the grating in an opposite direction and is split into a second set of individual light beams of different wavelengths or narrow bands of wavelengths.

According to another aspect of the invention there is provided an optical device for splitting up a multi-wavelength light beam into a plurality of individual beams of light of different wavelengths or narrow bands of wavelengths comprising:

an optical grating having a first part and a second part; and an optical system for directing an incident multi-wavelength light beam onto the grating such that the incident beam passes through the first and second parts of the grating in succession;

wherein the first and second parts of the grating together split the incident light beam into a set of individual beams of light of different wavelengths or narrow bands of wavelengths.

In a preferred embodiment of the invention, the optical grating has a first part and a second part, and the optical system is arranged to direct a first portion of the incident beam onto the first part of the grating and a second portion of the incident beam onto the second part of the grating.

The optical grating is preferably configured so that the first portion of the incident beam, after leaving the first part of the grating, is transmitted to the second part of the grating, and the two parts of the grating together split the first portion of the incident beam into a first set of individual beams of different wavelengths or narrow bands of wavelengths, and so that the second portion of the incident beam, after leaving the second part of the grating, is transmitted to the first part of the grating, and the two parts of the grating together split the second portion of the incident beam into a second set of individual beams of different wavelengths or narrow bands of wavelengths.

Thus, in this preferred embodiment, the incident multi-wavelength light beam is effectively divided into two portions, and each portion is directed through two parts of an optical grating in succession, with the two portions being directed through the two parts of the grating in opposite directions.

The optical grating may be either a transmission grating or a reflection grating. Accordingly, any reference herein to light passing through a grating are to be interpreted as either light passing from a first side to a second side of a transmission grating, or as light impinging upon one side of a reflection grating and returning from that side of the reflection grating.

References herein to "individual" beams of light of different wavelengths or narrow bands of wavelengths covers both discrete beams of light and a continuous spectrum of light, which can be regarded as comprising a series of adjacent beams of light.

The optical device is described above in the context of splitting up a multi-wavelength beam of light into a plurality of individual beams, i.e., when used as a de-multiplexer. However, the same optical device may also be used as a multiplexer by reversing the direction of transmission of light through the optical device. Thus, the present invention can be used as a de-multiplexer or as a multiplexer.

Additional advantages, objects, and features of the invention will be set forth in part in the description which follows and in part will become apparent to those having ordinary skill in the art upon examination of the following, or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements, wherein.

DETAILED DESCRIPTION OF PREFERRED EMBODIMENTS

Figure 1:
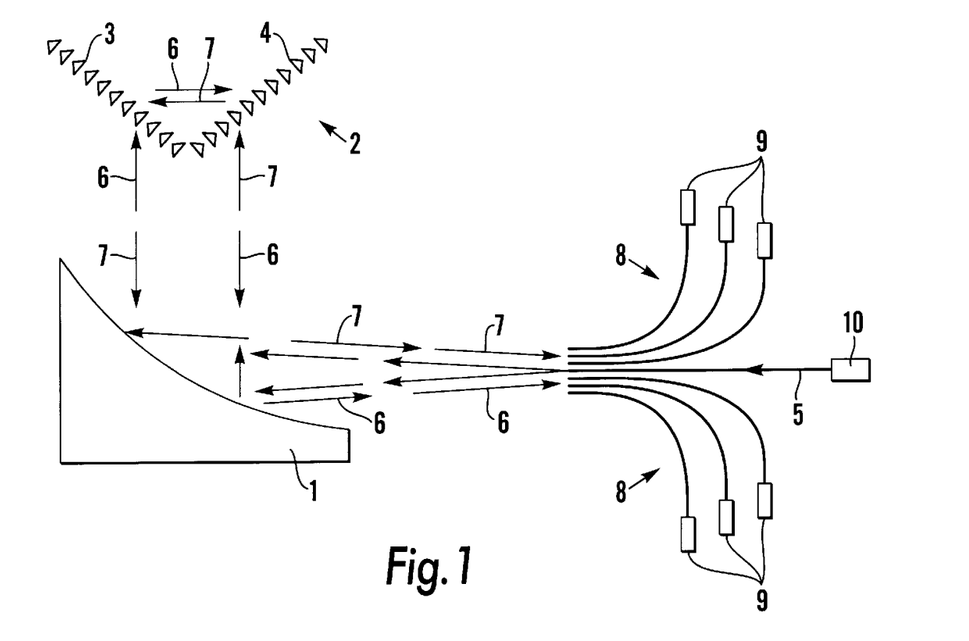
FIG. 1 is a schematic diagram of an optical device in accordance with a first embodiment of the invention.

With reference to FIG. 1, the optical device comprises a concave mirror 1, shown in end view, and an optical transmission grating 2 which comprises a first part 3 and a second part 4. An incident multi-wavelength divergent beam of light 5, e.g., from a superluminescent diode (SLD) 10, is directed to the surface of the mirror 1. Upon reflection from the surface of the mirror 1, the multi-wavelength beam of light is collimated and, by appropriate positioning of the mirror 1 relative to the grating 2, is effectively divided into two portions 6 and 7, and directed to the optical transmission grating 2.

One portion 6 of the collimated multi-wavelength beam passes through the first part 3 of the grating 2, where it is split into a first set of individual beams of different wavelengths or narrow bands of wavelengths. The first part 3 of the grating 2 directs the first set of individual beams towards the second part 4 of the grating 2, which splits the first set of individual beams further and then directs them back to the mirror 1.

The other portion 7 of the collimated multi-wavelength beam passes through the second part 4 of the grating 2, where it is split into a second set of individual beams of different wavelengths or narrow bands of wavelengths. The second part 4 of the grating 2 directs the second set of individual beams towards the first part 3 of the grating 2, which splits the second set of individual beams further and then directs them back to the mirror 1. The wavelength resolution of the optical device is thus increased by passing the incident beam of light 5 through two optical transmission gratings in succession.

The mirror 1 reflects, focuses and directs the two sets of individual beams to a set of receiving waveguides 8, arranged so that each individual beam is coupled to a respective waveguide. The multi-wavelength beam is thus split into individual beams of light of different wavelengths or narrow bands of wavelengths by the grating 2, and each individual beam is reflected from and focused by a different point on the mirror 1 so that, with appropriate positioning of the receiving waveguides 8, each waveguide 8 receives a respective one of the individual beams. The geometry of the optical systems is preferably arranged so that light of the same wavelength in the two portions 6 and 7 of the beam 5 is re-combined and directed to the same receiving waveguide 8. Thus, two portions of the beam 5 with the same wavelength are re-combined so they spatially coincide.

Figure 2:
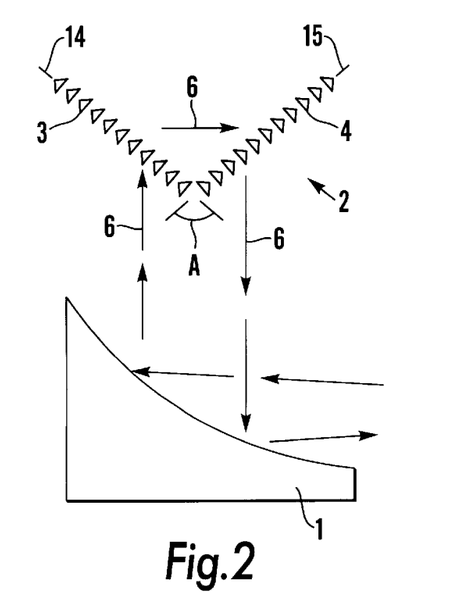
FIG. 2 is a schematic diagram showing how a first portion of the incident multi-wavelength beam passes in one direction through the optical transmission grating shown in FIG. 1.
Figure 3:
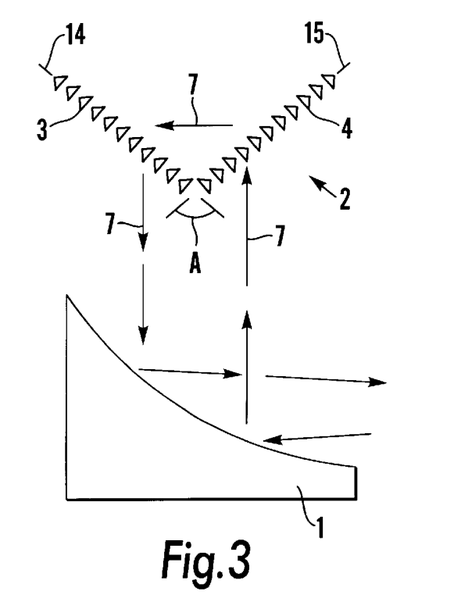
FIG. 3 is a schematic diagram showing how a second portion of the incident multi-wavelength beam passes in an opposite direction through the optical transmission grating shown in FIG. 1.

The optical paths of the two beam portions 6 and 7 through the optical device of FIG. 1 are shown in more detail in FIGS. 2 and 3, respectively. It will be appreciated that each beam portion 6 and 7 of the multi-wavelength light beam 5 passes through the two parts 3 and 4 of the grating 2 in succession, with one portion 6 traveling in a clockwise direction, as shown in FIG. 2, and the other portion 7 traveling in a counterclockwise direction, as shown in FIG. 3. Nevertheless, as indicated above, the components of the optical device are preferably arranged such that light of a predetermined wavelength or narrow wavelength band is received by the same receiving waveguide 8, regardless of which path is has taken around the optical circuit.

Figure 4:
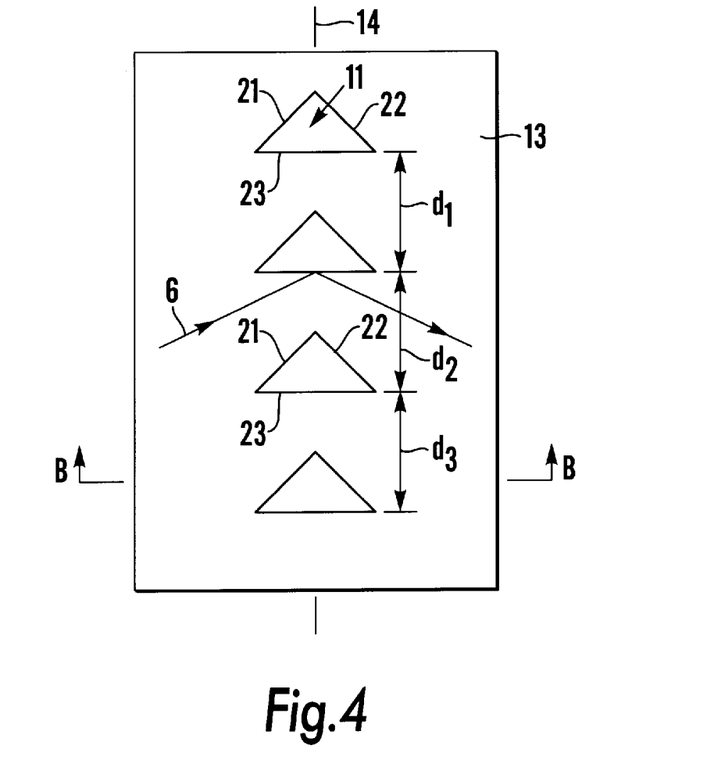
FIG. 4 is a schematic diagram of the optical transmission grating of FIG. 1.

The two parts 3 and 4 of the optical transmission grating 2 are designed to split up the incident multi-wavelength light beam 5 into individual beams as required. The grating 2 is shown in more detail in FIGS. 4 and 5. FIG. 4 is a plan view of the first part 3 of the grating 2, and shows how the grating 2 preferably comprises a linear array of generally triangular recesses 11 in a layer 13 of transparent material, e.g., silicon on a silicon-on-insulator chip. The recesses 11 are spaced by distances d1, d2, d3, etc.

Figure 5:
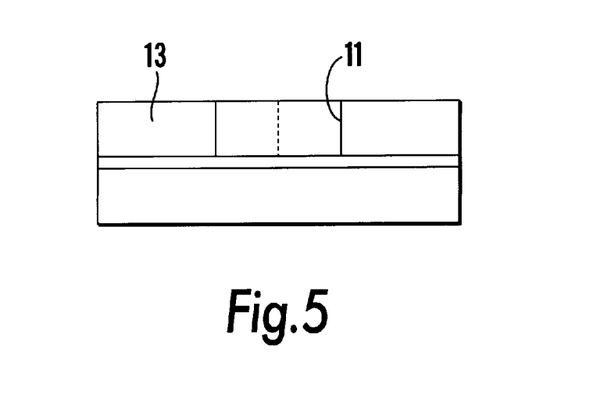
FIG. 5 is a sectional view taken along the section line 5—5 of FIG. 4.

FIG. 5 is a cross-sectional view along the section line 5—5 of FIG. 4, showing how the recesses 11 extend through the layer 13. The second part 4 of the grating 2 (not illustrated) preferably has the same structure. The two parts 3 and 4 of the grating 2 are preferably formed adjacent to each other so they meet at a point as shown.

As illustrated in FIGS. 2 and 3, the array of recesses 11 forming the first part 3 of the grating 2 extends along a first axis 14, and the array of recesses forming the second part 4 of the grating 2 extends along a second axis 15. The two axes 14 and 15 are inclined at an angle A with respect to each other so that each beam portion 6 and 7 of the incident multi-wavelength light beam 5, after passing through one of the parts 3 and 4 of the grating 2, is directed to the other part and, after passing through the other part, is directed back to the mirror 1, as illustrated.

As described above, the mirror 1 re-directs light returning from the grating 2 to light receiving means, e.g., the series of receiving waveguides 8, which, in turn, direct the light to respective light sensors 9. The waveguides 8 may, for instance, comprise a series of integrated rib waveguides, with each waveguide positioned to receive a respective wavelength or band of wavelengths as the light beams return from the mirror 1 along different wavelength-dependent propagation angles. The propagation angles are wavelength-dependent because the light beams have undergone dispersion at the grating 2. The waveguides 8 direct the light beams to respective light sensors 9, such as photodiodes. Alternatively, the waveguides 8 may be an array of optical fibres (as described further below in connection with FIG. 10), or the waveguides 8 may lead to an array of optical fibres.

In another arrangement the geometry of the optical system may be arranged so that the two beam portions 6 and 7 traveling in opposite directions through the grating 2 are not re-combined, e.g., if one portion is used to monitor the output of the light source 10. Such an arrangement is described below in connection with FIG. 10.

The embodiment shown in FIG. 1 increases the dispersion of the incident beam 5 by passing each beam portion 6 and 7 through the two parts 3 and 4 of the grating 2 in succession. Also, the embodiment shown in FIG. 1 is compact because the light beam 5 is divided into two beam portions 6 and 7, which are passed through the two parts 3 and 4 of the grating 2 in opposite directions with respect to each other. The embodiment of FIG. 1 also saves considerable space by using the same mirror 1 to direct light towards the grating 2 and to receive light returning from the grating 2. Furthermore, as the wavelength dispersion is increased, the distance between the receiving waveguides 8 and the grating 2 can be reduced because the required separation between light beams of different wavelengths is achieved over a shorter distance.

In addition to saving space, the reduction in the number of components also simplifies the fabrication of the optical device because the fewer the components, the lower the risk that a faulty component will impair performance of the optical device. The production yield of an optical device comprising a small number of components, such as the optical device shown in FIG. 1, is thus likely to be higher. This results in a savings in production costs compared to prior arrangements that use a plurality of mirrors.

The optical devices of the present invention may be formed on an optical chip, such as a silicon-on-insulator (SOI) chip. An SOI chip enables easy integration of the various components of the optical device and enables relatively low fabrication costs. Further details of SOI chips and of rib waveguides formed thereon are given in U.S. Pat. No. 5,757,986 which is herein incorporated by reference in its entirety. Methods of mounting components, such as the optical detectors shown in FIG. 1, on a silicon-on-insulator chip are described in U.S. patent application Ser. No. 08/853,104 U.S. Pat. No. 5,881,190 and in U.S. patent application Ser. No. 09/019,729, both of which are herein incorporated by reference in their entirety.

The incident multi-wavelength beam 5 may be provided by a broadband source 10, such as a long coherence length SLD, which may also be mounted or hybridised on an silicon-on-insulator chip, as described in U.S. patent application Ser. No. 08/853,104 U.S. Pat. No. 5,881,190 and in U.S. patent application Ser. No. 09/019,729, both of which are herein incorporated by reference in their entirety. The incident multi-wavelength beam 5 may also be received from another source, e.g., from an external source connected to a waveguide by an optical fibre. The above-identified references are incorporated by reference herein for appropriate teachings of additional or alternative details, features and/or technical background.

The construction and operation of an optical transmission grating 2 comprising a liner array of recesses 11 by electron beam or photolithographic techniques are well known and will not be described in detail. As illustrated in FIGS. 4 and 5, each recess 11 is formed by two surfaces 21 and 22 extending generally at right angles to each other and connected by a third surface 23. The portion 6 of the incident light beam 5 reflected from the mirror 1 travels through the layer 13 towards the array of recesses 11 and undergoes total internal reflection at the surface 23 of the recesses 11, because the refractive index of the layer 13 is greater than the refractive index of the recesses (which would typically be air). The light beam portion 6 leaves the array of recesses 11 in a well known manner in the form of an optical interference pattern comprising a series of intensity peaks at different angular positions relative to the axis 14, with each peak comprising light of a particular wavelength or narrow band of wavelengths.

The optical transmission grating 2 is preferably formed of arrays of deep etched recesses 11 with reflecting surfaces 21, 22 and 23 having widths preferably in the range of 5–20 microns. The distances d1, d2, and d3 between the recesses 11 are preferably in the range of 5–20 microns, and the grating 2 has a length along each axis 14 and 15 preferably in the range of 500 microns to 2 millimeters. The surfaces 23 are preferably at right angles to the axes 14 and 15. The angle A between the axes 14 and 15 is preferably a right angle so that the beam portions 5 and 7 travel substantially parallel to each other between the mirror 1 and the grating 2.

The mirror 1 may also be formed in a layer of silicon by a deep etch extending all the way through the light guiding layer 13, and is preferably from a few hundred microns to a few millimeters wide.

As discussed above, an advantage of the optical device is its compactness due to the light beam portions 6 and 7 following substantially the same optical path in opposite directions, and due to the use of only one optical system, i.e., the mirror 1, for collimating the incident beam 5, directing it to the optical grating parts 3 and 4, and directing the sets of individual beams emerging from the optical grating parts 3 and 4 to the receiving waveguides 8. The mirror 1, illustrated in FIGS. 1, 2 and 3, also preserves the phase distribution of the incident light beam 5 and, therefore, does not cause the loss of coherence.

Figure 6:
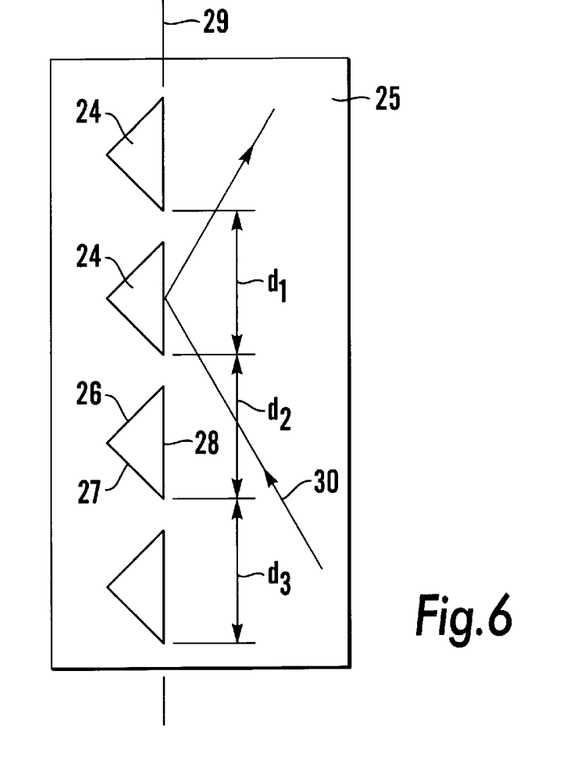
FIG. 6 is a schematic diagram of an optical reflection grating in accordance with the present invention.

FIG. 6 illustrates an optical reflection grating, constructed in a manner similar to the optical transmission grating described above with reference to FIGS. 4 and 5. The reflection grating is formed from a linear array of generally triangular recesses 24 in a layer 25 of transparent material. Each recess 24 is formed with two surfaces 26 and 27 extending generally at right angles to each other and connected by a third surface 28. The surfaces 28 of the array of recesses 24 extend along an axis 29. The recesses 24 are spaced by distances d1, d2, d3, etc. In operation, a portion 30 of an incident light beam travels through the layer 25 to the array of recesses 24 and undergoes total internal reflection at the surfaces 28, because the refractive index of the layer 25 is greater than the refractive index of the material in the recesses 24 (which would typically be air). The incident light beam portion 30 is therefore reflected away from the reflection grating and, similar to a transmission grating, the reflected light beam leaves the recesses 24 in a well known manner in the form of an optical interference pattern comprising a series of intensity peaks at different angular positions relative to the axis 29. Each intensity peak comprises light of a particular wavelength or narrow band of wavelengths.

Figure 7:
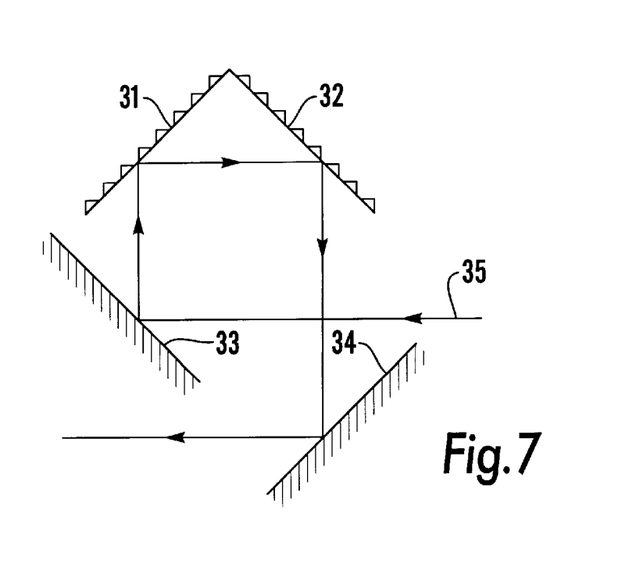
FIG. 7 is a schematic diagram of an optical device, in accordance with a second embodiment of the invention, that includes the optical reflection grating of FIG. 6.

FIG. 7 illustrates an optical device using an optical reflection grating in accordance with the present invention. The reflection grating comprises two parts 31 and 32 arranged with their axes at right angles, and two mirrors 33 and 34 also arranged at right angles. An incident multi-wavelength light beam 35 is reflected off a first mirror 33 onto the first part 31 of the reflection grating. The beam is reflected off the first grating part 31 onto the second grating part 32. The beam is reflected off the second grating part 32 onto a second mirror 24. The incident beam 35 is initially split up by reflection from the first grating part 31 into a set of individual light beams of different wavelengths or narrow bands of wavelengths, and is further split up by reflection from the second grating part 32. As in the two part transmission grating in the optical device of FIG. 1, the wavelength resolution of the optical device is improved by reflecting the incident beam of light 35 from the two parts 31 and 32 of the optical reflection grating in succession.

FIG. 7 shows the incident beam 35 being directed toward the first grating part 31, and being reflected therefrom to the second grating part 32 and then to the mirror 34. In the embodiment of FIG. 7, the beam 35 is not split into two parts which are each directed to a respective part of the grating and then reflected to the other part of the grating. However, the embodiment of FIG. 7 may be modified to operate in this manner, e.g., by appropriate positioning of the mirrors 33 and 34, by the use of one or more semi-reflecting mirrors, or by the use of other types of optical systems.

Figure 8:
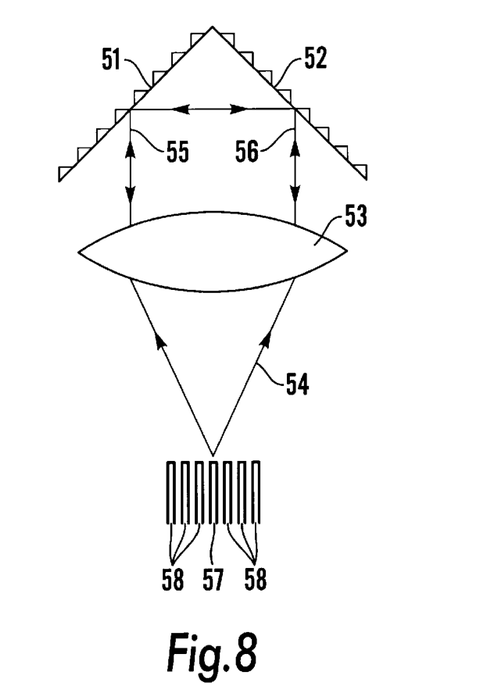
FIG. 8 is a schematic diagram of an optical device, in accordance with a third embodiment of the invention, that includes the optical reflection grating of FIG. 6.

FIG. 8 illustrates a third embodiment of the optical device of the present invention. The optical device includes an optical reflection grating comprising two parts 51 and 52, and a lens 53. An incident multi-wavelength light beam 54 from an input waveguide 57 is collimated by passing through the lens 53, and is effectively divided into two beam portions 55 and 56 by the positioning of the lens 53 relative to the grating parts 51 and 52. Beam portion 55 is reflected and split up by the grating part 51 and beam portion 56 is reflected and split up by the grating part 52. The split up beam portion 55 is passed to and is further reflected and split up by grating part 52. The split up beam portion 56 is passed to and is further split up and reflected by grating part 51. The split up beam portions 55 and 56 then pass back to the lens 54, which focuses the individual light beams of different wavelengths or narrow bands of wavelengths to respective output waveguides 58. As in the two part transmission grating in the optical device of FIG. 1, the wavelength resolution of the optical device is improved by passing the incident beam of light 54 through two optical grating parts 51 and 52 in succession.

The input waveguide 57 and output waveguides 58 may be arranged in a manner similar to that shown and described above in relation to FIG. 1. Conveniently, the input and output waveguides 57 and 58 may comprise rib waveguides which lead to respective optical fibres (not shown), e.g., an optical fibre ribbon. The lens 53 may be an appropriately shaped deep-etched recess etched in the chip. Such integrated lenses are well known and will not be described in detail.

Figure 9:
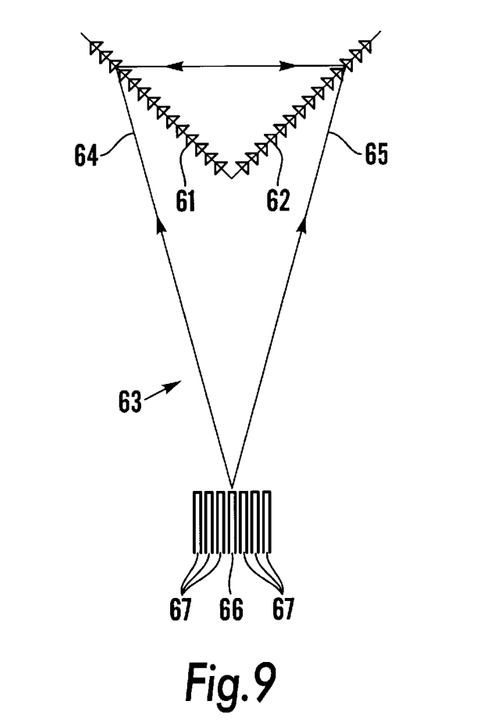
FIG. 9 is a schematic diagram of an optical device, in accordance with a fourth embodiment of the invention, that includes a chirped grating.

FIG. 9 illustrates a fourth embodiment of the optical device of the present invention. The optical device uses a chirped optical transmission grating comprising two parts 61 and 62. An incident multi-wavelength light beam 63 from an input waveguide 66 is effectively divided into two beam portions 64 and 65. Beam portion 64 is split up by and transmitted through the grating part 62. The split up beam portion 64 is passed to and further split up by and transmitted through the grating part 62, and split up beam portion 65 is further split up by and transmitted through the grating part 61. Since the grating parts 61 and 62 are chirped, the split up beam portions, on emergence from the grating parts 61 and 62, are focused. Accordingly, a lens such as the one shown in FIG. 8 is not required.

The beam portions 64 and 65 are thus split up into individual light beams of different wavelengths or narrow bands of wavelengths, and the individual light beams are focused to respective output waveguides 67. As in the two part transmission grating in the optical device of FIG. 1, the wavelength resolution of the optical device of FIG. 9 is improved by passing the incident beam of light 63 through two optical grating parts 64 and 65 in succession.

The input and output waveguides 66 and 67 are similar to those shown in the optical device of FIG. 8. The waveguide 66 and 67 are spaced from each other preferably by 10 to 20 microns, and may be connected to optical fibres (not shown) in an optical fibre ribbon (which are typically spaced from each other by about 250 microns) by forming the waveguides 66 and 67 so they diverge from each other to an appropriate spacing which matches that of the optical fibres in the optical fibre ribbon.

The chirped optical transmission gratings used in the optical device of FIG. 9 are well known and are generally fabricated in the manner illustrated in FIGS. 4 and 5, except that the spacing between adjacent recesses 11 varies along the axes 14 and 15 in a known manner to achieve the desired focusing effect (chirping). A further advantage of the optical device of FIG. 9 is that, because the splitting up or dispersion of the beam portions 64 an 65 is shared between the two gratings 61 and 62, the focusing provided by "chirping" the gratings is also split into two with half of the focusing being provided by each grating. This enables the angle of incidence of the light beams on the surfaces 23 of the recesses 11 to be less than the critical angle, so that total internal reflection occurs and, therefore, little light is lost through the surface 23. With prior devices that use a chirped grating, it is often difficult to arrange for the angle of incidence to be less than the critical angle. Therefore, only part of the light is reflected from the grating and a large proportion of the light is lost by transmission through the grating in prior devices.

As indicated above, because the optical device of FIG. 9 uses a chirped grating, which both disperses light of different wavelengths and focuses the output light, it dispenses with the need to provide a mirror or other means to focus the different wavelengths to the respective waveguides.

It should be appreciated that each of the embodiments described above may use either a transmission grating or a reflection grating. The transmission grating shown in FIGS. 1–3 and 9 may thus be replaced by a reflection grating, and the reflection grating shown in FIGS. 7 and 8 may be replaced by a transmission grating.

The optical system employed to guide the light beams through the optical device may take different forms and may comprise one or more mirrors or semi-reflecting mirrors, mirrors of other forms, lenses, etc. depending on the required function of the optical device.

It should also be appreciated that the optical device of the present invention may be used as a multiplexer, rather than as a de-multiplexer, by substituting light sources, each of a single wavelength or narrow wavelength band of wavelengths, for the light receivers 9, and substituting light receiving means for the multi-wavelength source described above. Operation of the device as a multiplexer is similar to its operation as a de-multiplexer, except that the direction of light transmitted through the optical device is reversed.

Figure 10:
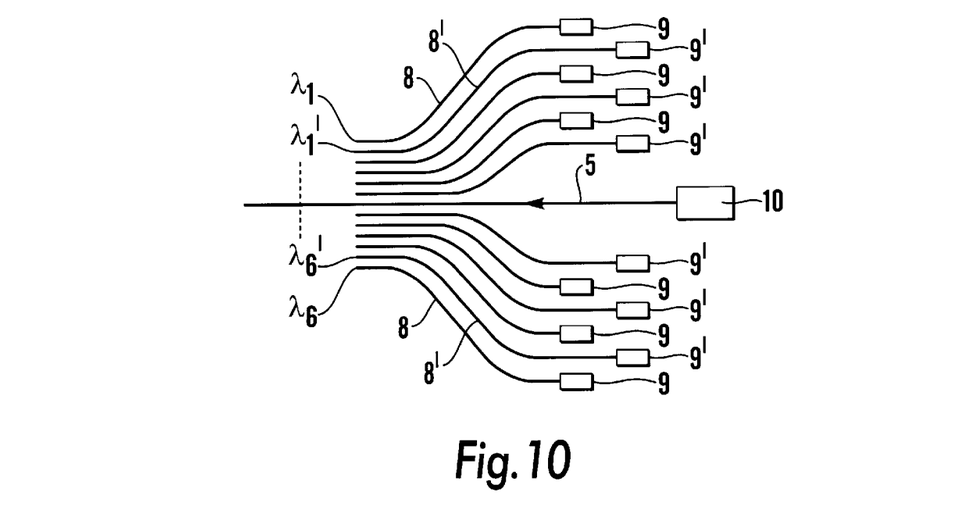
FIG. 10 is a schematic diagram of a portion of an optical device in accordance with a fifth embodiment of the invention.

FIG. 10 is an enlarged view of a portion of an optical device, such as the optical device of FIG. 1, in which the geometry of the optical system, the mirror and/or the grating is arranged so that the two portions of the beam are not re-combined. Instead signals from a first portion of the beam, e.g., signals $\lambda_1, \lambda_2, \lambda_3, \lambda_4, \lambda_5$ and $\lambda_6$ are directed into waveguides 8 which lead to a first set of detectors 8, whereas signals $\lambda_1', \lambda_2', \lambda_3', \lambda_4', \lambda_5$40 and $\lambda_6'$, are directed into waveguides 8', which lead to a second set of detectors 9'. One set of detectors may be used to provide output signals, while the other set of detectors may be used to monitor the outputs so that feedback control can be provided to the SLD 10.

The optical device described herein may be used in the apparatus described in U.S. patent application Ser. No. 09/083,175, the disclosure of which is incorporated herein by reference.

Figure 11:
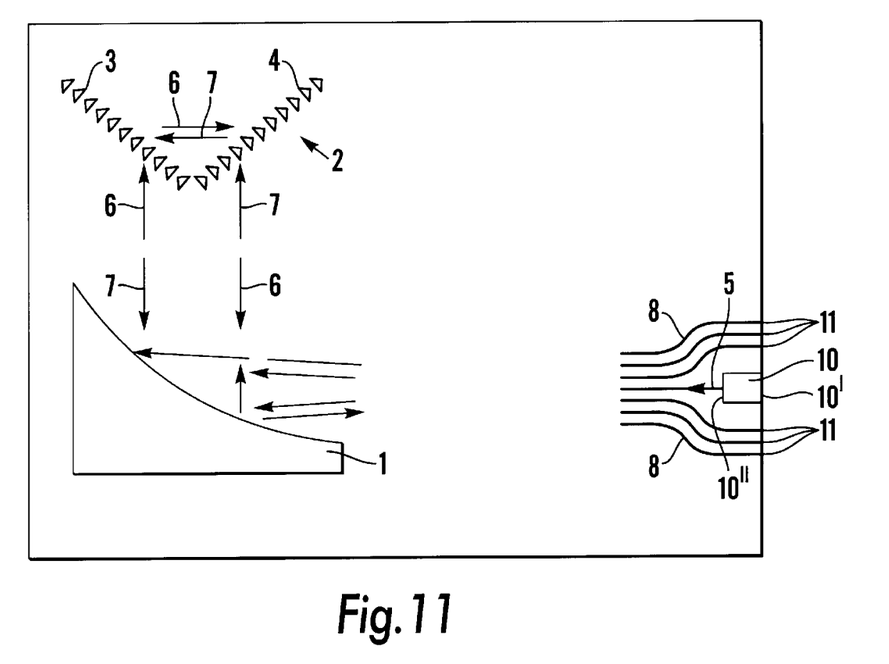
FIG. 11 is a schematic diagram of an optical device in accordance with a sixth embodiment of the invention.

As shown in FIG. 11, the optical device of the present invention may receive light from a broadband laser source such as an SLD 10, having a high reflection (HR) coated back facet 10' and an anti-reflective (AR) coated front facet 10" (to prevent a laser cavity from being formed with the SLD). The waveguides 8 lead to end facets 11 having semi-reflective coatings thereon. Laser cavities are thus formed between the HR coated facet 10' and the respective semi-reflective coated facets 11, and laser output is provided through the semi-reflective coated facets 11, with each waveguide 8 providing a different wavelength. In this arrangement, the SLD 10 acts as a laser amplifier for all wavelengths, and separate modulators (now shown) may be provided in each waveguide 8 to modulate the output signals.

Figure 12:
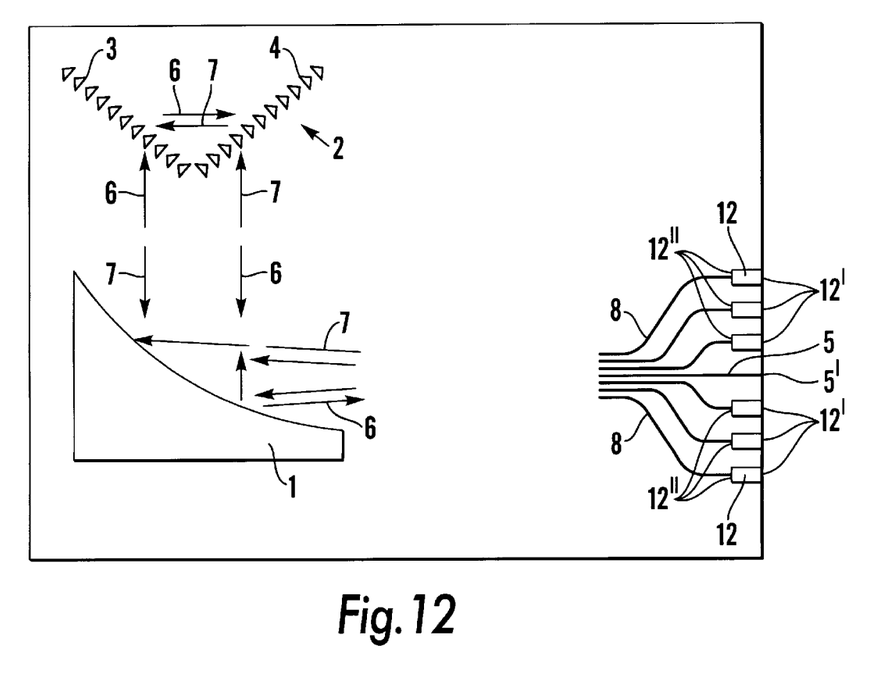
FIG. 12 is a schematic diagram of an optical device in accordance with a seventh embodiment of the invention.

FIG. 12 shows a further embodiment of the optical device of the present invention, in which the optical device is used as a multiplexer rather than a de-multiplexer. In this arrangement, a laser diode 12 is provided for each waveguide 8, with each laser diode having a high reflection (HR) coated back facet 12' and an anti-reflective (AR) coated front facet 12" (to prevent a laser cavity from being formed with the laser diode). Waveguide 5 is used as an output waveguide and has an end facet 5' provided with a semi-reflective coating. Laser cavities are thus formed between the semi-reflective coated facet 5' and the respective HR coated facets 12', and the signal output through the semi-reflective facet 5 comprises a multiplexed signal of the outputs of the individual laser diodes 12. In this arrangement, each laser diode 12 acts a gain element and modulates the respective wavelength it emits.

The laser diodes 12 may each be hybridised on the chip in the manner described in U.S. patent application Ser. No. 08/853,104, referred to above, or they may be provided in the form of a laser bar, i.e., a series of laser diodes on a common strip hybridised on the chip.

In the above arrangements, the optical device is thus integrated within a laser cavity or multiple laser cavities, and is used to multiplex or de-multiplex lasing wavelengths within the cavity or cavities. Such an arrangement may be used as a transceiver operating on multiple wavelengths, or in other apparatus requiring wavelength division multiplexing or de-multiplexing of laser light.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, a focusing mirror and lens may not be structural equivalents in that focusing mirror employs a curved reflective surface to focus light, whereas a lens employs a curved transmissive surface to focus light via refraction, in the environment of focusing light, a focusing mirror and a lens may be equivalent structures.

What is claimed is:

1. An optical device, comprising:
   an optical grating; and
   a first optical system for directing an incident multi-wavelength light beam onto the grating so that a first portion of the light beam passes through the grating in one direction and is split into a first set of individual light beams of different wavelengths or narrow bands of wavelengths, and a second portion of the light beam passes through the grating in a second direction and is split into a second set of individual light beams of different wavelengths or narrow bands of wavelengths.

2. The optical device of claim 1, further comprising:
   a plurality of optical receivers; and
   a second optical system for receiving the individual beams from the optical grating and directing the individual beams to respective optical receivers.

3. The optical device of claim 2, wherein the plurality of optical receivers comprise a plurality of integrated waveguides, wherein each waveguide is positioned to receive a respective one of the individual beams.

4. The optical device of claim 3, wherein the plurality of waveguides lead to a plurality of optical detectors.

5. The optical device of claim 4, wherein the plurality of waveguides lead to fibre coupling means adapted to receive optical fibres over which the respective individual beams are to be transmitted.

6. A laser cavity comprising the optical device of claim 2.

7. The laser cavity of claim 6, adapted to receive light from a multi-wavelength source and provide an output comprising a plurality of laser wavelengths.

8. The optical device of claim 2, wherein the first and second optical systems comprise a common mirror for directing the incident multi-wavelength light beam onto the grating and for receiving the individual beams from the grating.

9. The optical device of claim 1, wherein the optical grating comprises a first part and a second part.

10. The optical device of claim 9, wherein the two parts of the grating are co-planar and inclined to each other at an angle.

11. The optical device of claim 10, wherein the angle comprises a right angle.

12. The optical device of claim 9, wherein the first optical system is arranged to direct the first portion of the incident beam onto the first part of the grating, and the second portion of the incident beam onto the second part of the grating and wherein the optical grating is adapted to transmit the first portion of the incident beam from the first part of the grating to the second part of the grating and transmit the second portion of the incident beam from the second part of the grating to the first part of the grating, wherein the first and second parts of the grating together split the first portion of the incident beam into a first set of individual beams of different wavelengths or narrow bands of, wavelengths, and split the second portion of the incident beam into a second set of individual beams of different wavelengths or narrow bands of wavelengths.

13. The optical device of claim 1, wherein the optical grating comprises a chirped grating.

14. The optical device of claim 13, adapted to receive a diverging multi-wavelength light beam from an input waveguide or optical fibre, and wherein the chirped grating is adapted to direct light to a plurality of receiving waveguides or receiving optical fibres each positioned to receive light of a predetermined wavelength or predetermined narrow wavelength band from the chirped grating.

15. The optical device of claim 1, wherein said first and second sets of individual beams are re-combined by the first optical system after passing through the optical grating.

16. The optical device of claim 1, wherein the optical grating comprises a transmission grating.

17. The optical device of claim 1, wherein the optical grating comprises a reflection grating.

18. The optical device of claim 1, integrated on a silicon chip.

19. A multiplexer comprising the optical device of claim 1.

20. An optical device comprising:

an optical grating having a first part and a second part; and a first optical system for directing an incident multi-wavelength light beam onto the optical grating so that the incident light beam passes through the first and second parts of the grating in succession, wherein the first and second parts of the grating act together to split the incident light beam into a set of individual beams of light of different wavelengths or narrow bands of wavelengths.

21. The optical device of claim 20, further comprising:

a plurality of optical receivers; and a second optical system for receiving the individual beams from the optical grating and directing the individual beams to respective optical receivers.

22. The optical device of claim 21, wherein the plurality of optical receivers comprise a plurality of integrated waveguides, wherein each waveguide is positioned to receive a respective one of the individual beams.

23. The optical device of claim 22, wherein the plurality of waveguides lead to a plurality of optical detectors.

24. The optical device of claim 23, wherein the plurality of waveguides lead to fibre coupling means adapted to receive optical fibres over which the respective individual beams are to be transmitted.

25. A laser cavity comprising the optical device of claim 21.

26. The laser cavity of claim 25, adapted to receive light from a multi-wavelength source and provide an output comprising a plurality of laser wavelengths.

27. The optical device of claim 21, wherein the first and second optical systems comprise a common mirror for directing the incident multi-wavelength light beam onto the grating and for receiving the individual beams from the grating.

28. The optical device of claim 20, wherein the two parts of the grating are co-planar and inclined to each other at an angle.

29. The optical device of claim 28, wherein the angle comprises a right angle.

30. The optical device of claim 20, wherein the optical grating comprises a chirped grating.

31. The optical device of claim 30, adapted to receive a diverging multi-wavelength light beam from an input waveguide or optical fibre, and wherein the chirped grating is adapted to direct light to a plurality of receiving waveguides or receiving optical fibres each positioned to receive light of a predetermined wavelength or predetermined narrow wavelength band from the chirped grating.

32. The optical device of claim 20, wherein the optical grating comprises a transmission grating.

33. The optical device of claim 20, integrated on a silicon chip.

34. The optical device of claim 20, wherein the optical grating comprises a reflection grating.

35. A multiplexer comprising the optical device of claim 20.

* * * * *